3,065,086
PROCESS FOR PREPARING STERILIZED CONCENTRATED MILK PRODUCTS
Abraham Leviton, Washington, D.C., and Michael J. Pallansch, Vienna, Va., assignors to the United States of America as represented by the Secretary of Agriculture
No Drawing. Filed July 14, 1960, Ser. No. 42,951
13 Claims. (Cl. 99—212)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for preparing concentrated milk products, and particularly relates to a process for preparing concentrated milk products with improved heat stability and storage life.

Sterile concentrated milk products such as evaporated milk are ordinarily prepared by concentrating normal or modified fluid milk to produce a concentrate of the desired content of total solids and the desired ratio between fat and total solids, preferably homogenizing at some point in the preparation of the concentrate, packaging the concentrate in cans or bottles, and sterilizing the packaged concentrate with heat.

There are well-recognized liabilities in the sterile milk products prepared by previously developed processes. It is known that the use of high temperatures and short times of sterilization results in sufficient destruction of contaminating organisms without the unwanted side-effects of imparting off-color and off-flavors which may occur with the long heating period required if lower sterilizing temperatures are used. However, use of the high temperature-short time method introduces the undesirable side effect of gel formation during storage of the product prepared by this method.

Gelling manifests itself in a characteristic manner. A storage period in which viscosity usually decreases is followed by one in which viscosity remains fairly steady. Finally, a period is observed in which the viscosity rises, slowly at first then more rapidly, until the concentrated milk, instead of flowing freely, begins to move as a body possessing a liver-like consistency. The soft body gradually gives way to a firm one, inhomogeneities appear and syneresis (exudation of milk serum) may be observed.

It is the object of the present invention to produce a packaged sterile concentrated milk product which is stable in storage for long periods of time against gel formation and stratification. It is another object of the present invention to produce a sterile concentrated milk product with improved resistance to heat coagulation. It is a further object of this invention to produce a packaged sterile concentrated milk product, the flavor of which will not deteriorate during storage of the product.

In general according to the invention about from 0.2% to 0.6%, based on the weight of the concentrated milk product, of a phosphatide, of a monoglyceride, of a diglyceride, or mixtures of these, is added to the product. The product containing the additive is preferably homogenized. It is heat sterilized and packaged.

Heretofore gelation has been construed to be a phenomenon in which protein particles aggregate and in which the aggregates subsequently interlock forming a network, the interstices of which contain the fat globules of milk. For the broad purposes of this invention, this concept of the phenomenon of gelation is retained only insofar as it concerns the interlocking of aggregates; and the gelation process will be considered therefore as a special kind of coagulation process. The teachings of the present invention depart somewhat from this concept of gelation stated above, and are based on the hitherto undisclosed observation that the suspended fat phase contributes to the coagulation process in concentrated milk in the same sense and at times to an even greater degree than the suspended proteins. Indeed it is quite surprising that the fat phase in homogenized milk should behave as it often does, as an inert phase, for the fat comprises about one-half of the total coagulable suspended phase in evaporated milk. If the interfacial region associated with the fat globules is inhibited by proteins, the globules should behave as suspended protein particles and coagulation both during sterilization and storage should be accelerated. That the fat phase behaves at all as a quasi-inert phase must mean that it is acting in virtue of the nonproteins (phosphatides and cholesterol) present in the interfacial region thereby acquiring the properties of a truly inert phase. Such a phase would actually limit the development of graininess by hindering free diffusion much in the same way as the fat phase retards the development of large ice crystals in ice cream manufacture. It is in virtue of these antagonistic properties, the ability to function either as a suspended protein or as a truly inert emulsoid, that the fat globules influence coagulation phenomena in evaporated milk. The addition of edible additive to milk modifies the composition of the interfacial region compelling the fat phase as a consequence to behave as a truly inert phase. For example, increasing the fat to protein ratio in milk usually leads to a product which is not more but less stable than the product derived from the unmodified control milk. If about 0.6% cephalin is added to both the high fat-low protein product and the control, it may be observed that a much higher measure of stabilization is achieved in the high fat-low protein product.

Modified milk compositions containing high ratio of fat to protein may be obtained by blending skim milk, cream and a diluent in desired proportions. Suitable diluents are milk serum, whey, and a synthetic mixture such as that disclosed in Example 1.

In general, to promote establishment of phase equilibrium, the additive is preferably added prior to the forewarming step and to the phase in which it is more soluble. The important feature is to achieve good dispersion of the additive in the milk product. The examples illustrate adding additive to milk prior to homogenization (Examples 3 and 4), after homogenization but prior to evaporation (Example 1), and after evaporation (Example 2). In preparing concentrated milks from reconstituted milk (Example 4), fat-soluble additive is preferably added to the fat phase.

The phosphatides, classically described as modified oils and fats, are organic compounds containing phosphorus. Their molecules contain, attached to a glyceryl radical, two fatty acid residues and a phosphoric acid moiety consisting of phosphoric acid attached to a nitrogenous organic base, thus:

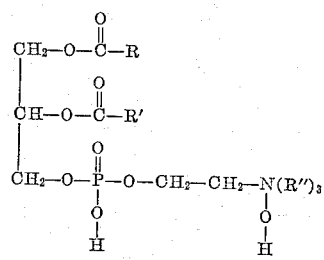

in which radicals R and R' are alkyl groups associated with corresponding fatty acids; R″ may be either a hydrogen atom as in cephalin (phosphatidylethanolamine) or it may be a methyl group as in lecithin (phosphatidylcholine). This representation is an oversimplification in that it takes into consideration neither the stereochemical configuration nor the charge distribution on the phosphoric acid—and the nitrogenous base moiety. In addition to these classical phosphatides there occurs in crude cephalin preparations a rather recently discovered compound, inositol phosphatide about which very little is known. A recent formulation based on a substantial amount of evidence is given below:

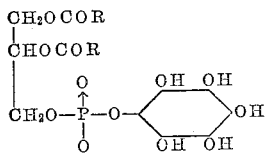

Crude cephalin preparations also contain substantial quantities of phosphatidyl serine.

Although the degree of stabilization of the concentrated milk product may vary slightly with the particular phosphatide or mixture of phosphatides added to the milk, the presence in the concentrated milk of at least about 0.2% by weight of phosphatides from either animal or vegetable source has been demonstrated to improve heat stability and storage qualities.

In demonstrating this invention, a storage temperature of 30° C. was selected, and viscosity measurements were made at this temperature. The improvement in stability of the product is considered as applicable to all storage conditions.

An average viscosity value for the evaporated milk of commerce is about 30 centipoises at 30° C. Hence, the following criterion of storage life has been adopted in evaluating products: the storage life of a sample is taken to represent the time required for the stirred-out viscosity to reach either (1) a value of 30 centipoises, or (2) a value which is twice the minimum viscosity observed during storage, whichever time is the longer. The stirred-out viscosity is defined as the viscosity of a sample after the position of the sample in a capillary tube container has been reversed twice by the application of centrifugal force.

prepared from commercial soybean lecithin according to procedures described by Folch in J. Biol. Chem.; 146, 35 (1942).

A modified milk having a high fat to protein ratio was prepared by blending cream, skim milk and synthetic serum solution to yield a milk product containing 4.5% fat and 2.4% protein. The synthetic serum contained the following:

| Compound: | Grams per liter |
|---|---|
| Lactose | 50 |
| Citric acid-$H_2O$ | 0.46 |
| KCl | 2.8 |
| $Na_2HPO_4$-$2H_2O$ | 2.24 | pH was adjusted to 6.6 (the pH of the milk). The resulting solution had an ionic strength of 0.075 compared with a cited value of 0.073 for milk ultrafiltrate.

The milk product was homogenized in two stages: at 7,500 pounds per square inch, and at 500 pounds per square inch. The homogenized product was divided into 4 portions. To each of 2 portions, 0.3 gram cephalin was added per 100 grams homogenized milk product. One portion of the cephalin-containing milk product, and one portion of the product containing no added cephalin were forewarmed at 100° for 17 minutes. The two remaining portions were not forewarmed. All portions were concentrated in vacuo to contain 26% solids. Thus a total of 4 concentrated milks were prepared, two containing about 0.6% added cephalin and two containing no added cephalin. Of those containing cephalin, and of those not containing it, one in each set was forewarmed.

Samples were introduced into bomb microviscometers fabricated from thin-walled capillary tubing and the viscometer and contents were sterilized in an oil bath at 137.4° C. for 15 seconds. The samples were cooled to room temperature and stored at 30° C. Viscosity coefficients (apparent) were determined before and after sterilization and during storage by measuring the time of transit between two marks of a small glass bead contained within the microviscometer. Viscosity measurements were made at 30° C. and during measurement the viscometers were inclined at an angle of approximately 10° to the vertical.

Measurement data and remarks are presented in Table 1.

TABLE 1

*Viscosity Measurements of HTST Sterilized Evaporated Milks Stored at 30° C.*

| Sample | Apparent Viscosity (cp.) | | Days for viscosity to reach— | | | Remarks |
|---|---|---|---|---|---|---|
| | Immediately after sterilization | Minimum during storage | End of steady state | Twice minimum viscosity | 30 cp. | |
| Unforewarmed; no cephalin | Firm gel | Firm gel | 0.0 | | 0.0 | Coagula noticeable immediately. |
| Unforewarmed; 0.6% added cephalin | Plastic (11.9)[a] | Plastic (11.9)[a] | 99 | 126 | 126–135 | Highly thixotropic structure forms immediately. |
| Forewarmed; no cephalin | 4.3[a] | 4.3[a] | 49 | 77 | 91 | |
| Forewarmed; 0.6% added cephalin | 5.4[a] | 5.0[a] | 240 | 240 | 240 | Highly thixotropic structure forms after 28 days. |

[a] Viscosity after sample had been inverted twice by centrifuging momentarily.

According to the criterion, the storage life of the large majority of samples of HTST evaporated milk products would come to an end at a time when viscosity is increasing quite rapidly. It is this instability of the product rather than its quality at the time which marks the end of product storage life.

The following examples illustrate the practice of this invention:

EXAMPLE 1

Chemical cephalin (phosphatidylethanolamine) was

Immediately after sterilization, it was observed that unforewarmed samples without cephalin had coagulated to form a firm gel-like structure. The milk thread within the tube did not move when the tube was centrifuged at approximately 500 g., nor did the bead move. It was observed that unforewarmed samples with cephalin possessed a plastic structure. The position of the milk thread could be readily reversed in the viscometer by centrifuging for just a brief time, and as a result the structure was largely destroyed, and a rather thin bodied product was obtained. The stirred-out viscosity remained fairly steady for 99 days and then began to increase gradually until at the end of 126 days the viscosity was about twice the lowest viscosity observed during storage. Between 126 and 135 days, the viscosity reached the value of 30 centipoises. Forewarming extended the storage life of HTST evaporated milk from 0 to 91 days. The effect of adding phosphatides is not lost in forewarmed milk nor is its effect superseded by the effect of forewarming. The combination of forewarming and adding cephalin prolonged the storage life of HTST evaporated milk products to more than 240 days. The presence of added cephalin (0.3 gram per 100 grams whole milk) resulted in the development of a highly thixotropic structure in both forewarmed and unforewarmed concentrated milk products.

This structure is distinguished from the objectionable gel structure by its high order of thixotropy and by its reversibility. It yields to mild shearing stresses, does not increase in firmness with time and is of such a weak character that it is detected only when the applied shearing stress in a viscosity measurement has an extraordinarily low magnitude. Since this structure is easily dissolved by the employment of mild stirring as, for example, in the inversion of the container which lodges the milk, certain new virtues (resistance to sedimentation and creaming) would be possessed by milk in which such a structure is present—virtues compared with which objectionable features would be relatively unimportant.

The following example illustrates the use of phosphatides of different chemical structure or source in the practice of this invention. Chemical cephalin was that prepared for use in Example 1. Lecithin was obtained from two sources. A highly purified chemical lecithin (phosphatidylcholine) was prepared from crude vegetable lecithin by the method of Thornton, Johnson and Ewan reported in Oil and Soap 21, 85 (1944). The animal lecithin of the example was a commercial product containing a mixture of phosphatides.

EXAMPLE 2

Whole milk containing 3.5% fat was homogenized as described in Example 1 and then forewarmed at 100° C. for 17 minutes. The forewarmed milk was concentrated to 30% solids, then adjusted to 26% total milk solids with water containing calculated amounts of phosphatides to give products having 26% total milk solids plus 0.33 gram added phosphatides per 100 grams sample, the phosphatides being chemical lecithin, chemical cephalin, and crude animal lecithin, respectively. Microviscometers were loaded with portions of the samples and the viscometers and contents were sterilized for 5 seconds at 137.4° C. Viscosity measurements were made immediately after sterilization and at regular intervals thereafter until viscosity reached 30 centipoises. Viscosity data and remarks are summarized in Table 2.

The viscosity of all samples began to drop immediately after sterilization and reached minimum values in approximately 38–41 days. The added phosphatides not only prolonged the storage life, but retarded the development of a cream plug.

Increasing the storage life of HTST sterilized concentrated milk by the addition of phosphatides, while contributing positively to the problem of structural changes in the product during storage, serves to accentuate the problem of development of off-flavors in evaporated milk packaged by usual procedures. Techniques have been developed, however, for preventing the development of off-flavors for storage periods as long as 8 months. As illustrated in the following example, this is accomplished by storing the product in a container which is sealed while evacuated to a pressure under 0.2 mm. mercury.

It appears that the development of off-flavors on storage is primarily associated with the oxygen which is enclosed with the packaged evaporated milk product. Although the total oxygen content of the system following evacuation is variable and not easily determined, some data are available for comparing the importance of the factors of residual oxygen content of fluid milk, oxygen absorbing capacity of the milk, and oxygen content of head space. A well deaerated sample of milk will contain approximately 0.15 microgram or $5 \times 10^{-3}$ micromole molecular oxygen per ml. of milk. In Example 3, the head space at a pressure of 0.2 mm. mercury will contain about 0.1 micromole oxygen per ml. of milk. Thus the total oxygen content of the packaged product would be determined largely by the oxygen in the head space, and the amount available for any particular sample would depend upon the amount of head space and the concentration of oxygen in this space.

TABLE 2

*Effect of Various Phosphatide Preparation on Storage Life of Concentrated Milk*

| Sample | Apparent Viscosity (cp.) | | Days for viscosity to reach— | | | Remarks |
|---|---|---|---|---|---|---|
| | Immediately after Sterilization | Minimum during storage | End of steady state | Twice minimum viscosity | 30 cp. | |
| Concentrated milk, 26% solids | ᵃ 16.4 | 7.2 | 38 | 65 | 88 | Cream layer visible after 70 days; occupies 6% of total volume. |
| Concentrated milk with added chemical lecithin | ᵃ 13.1 | 6.6 | 41 | 88 | 105 | No cream layer visible after 70 days. |
| Concentrated milk with added chemical cephalin | ᵃ 14.4 | 6.1 | 41 | 88 | 119 | Do. |
| Concentrated milk with added animal lecithin | ᵃ 16.1 | 6.2 | 41 | 85 | 105 | Do. |

0.3 ml. phosphatide solution containing 2.5 grams solids per 100 ml. added to 2 g. of 30% milk. Resulting mixture contained 26% milk solids and 0.33% added solids.
ᵃ Viscosity after sample had been inverted twice by centrifuging momentarily.

EXAMPLE 3

This example illustrates how egg yolk may be used as a source of phosphatides in preparing HTST evaporated milk products of long storage life. One dozen grade AA eggs were stripped of their whites to yield 178 grams egg yolks. The yolk analyzed 48.6% solids, 27.3% fat, 33.4% lipoids and 0.43% phosphatide phosphorus corresponding to approximately 11% phosphatide calculated as chemical lecithin. A milk product containing 2% egg yolk, 3.5% total fat (egg fat plus milk solids) was prepared from skim milk, cream and egg yolk. Simultaneously control milk containing 3.5% fat and 12.4% total solids was prepared. Both the control milk and the milk product were homogenized at 7,500 pounds per square inch and rehomogenized at 500 pounds per square inch. Prior to homogenization, the batches were heated rapidly to 70° C., the homogenization temperature. Samples were forewarmed at 100° C. in an atmosphere of nitrogen, and the forewarmed samples were concentrated in vacuo to 26 percent solids, to yield a product containing about 0.45% phosphatides. Two ml. portions were pipetted into modified culture tubes, and frozen in an acetone-Dry Ice bath. The tube containing the frozen sample was evacuated to a pressure of approximately 0.2 mm. mercury, and the evacuated tube was sealed off to leave an evacuated air space of about 10 cubic centimeters. The samples thawed out at room temperature were sterilized at 137.4° C. for 30 seconds and cooled rapidly to room temperature. During sterilization and cooling the samples were agitated gently by hand. Following storage of the samples at 30° C., it was observed that all of the control samples had assumed a liver-like body after 45 days' storage. The samples containing egg yolk showed no significant change in body after 90 days, nor were any significant off-flavors acquired during this period. The flavor of the milk product diluted to contain 12.5% solids was hardly distinguishable from mildly heated fresh milk.

EXAMPLE 4

This example illustrates the use in improving heat stability and storage qualities of a concentrated milk product prepared from reconstituted milk by adding a commercial food emulsifier containing mono- and diglycerides of fat-forming fatty acids, predominantly fatty acids containing 12 through 18 carbon atoms, with monoglycerides comprising about 55% of the total. To each of 50 gram samples of melted butter oil, liquid food emulsifier was added to yield clear solutions containing 0, 2, 4 and 6% emulsifier. Each of the oils was injected at a temperature of 70° C. and an injection pressure of 4,800 pounds per square inch into 100 milliliter samples of skim milk to yield milk containing slightly more than 4% fat solution. The milks were adjusted with skim milk to contain 4% fat solution and emulsifier in concentration of 0, 0.08, 0.16 and 0.24%, respectively; the 4% milks were pasteurized by heating to 70° C. and the pasteurized milks were cooled to 20° C. and stored in a refrigerator. Seventy-five milliliter samples were homogenized at 3,200 pounds per square inch at 70° C. with a hand homogenizer, and rehomogenized. The homogenized samples were concentrated in vacuo to contain 27% solids. Correspondingly, a sample of skim milk was concentrated to contain 19.6% solids. Samples were loaded into viscometers and sterilized at 137° C. for 15 seconds.

TABLE 3

*Effect of Emulsifier on Storage Life of Evaporated Milk Product*

| Ingredients combined with skim milk | | | Storage Life, days |
|---|---|---|---|
| Butteroil, percent | Emulsifier in | | |
| | Butteroil, percent | Product, percent | |
| 0 | 0 | 0.00 | 78 |
| 4 | 0 | 0.00 | 0 |
| 4 | 2 | 0.08 | 54 |
| 4 | 4 | 0.16 | 70 |
| 4 | 6 | 0.24 | 71 |

Milk concentrates containing no emulsifier suffered pronounced coagulation on sterilization. The concentrate containing 2 grams emulsifier per 100 grams fat thickened during sterilization. The sterile heavy product exhibited considerable false body, that is, a strong tendency to thin out during storage. Increasing the emulsifier concentration to 4 grams per 100 grams fat relieved the tendency to coagulate. A thin-bodied sterile product was obtained, the viscosity characteristics and the storage life of which approached that of the sterile concentrated skim milk control. Increasing emulsifier concentration further brought with it only slight changes. Not only heat stability but also storage stability increased significantly with increasing modification of the fat phase with fat-soluble emulsifier. The fat phase containing 4–6% emulsifier behaved very nearly as an inert phase. The storage life of the skim milk concentrate and the various concentrates containing 0, 2, 4 and 6 grams emulsifier per 100 grams fat was respectively, 78, 0, 54, 70 and 71 days. The heat stability as well as storage stability are improved by the addition of the fat-soluble monoglyceride-diglyceride emulsifier in Example 4 and by the addition of cephalin in Example 1. Of the two improvements noted, prolongation of storage life would be the predominant improvement in the application of interfacial active additives to high temperature-short time milk concentrates, and increase in heat stability would be the predominant improvement in the application of these additives to sterile concentrated milks as conventionally prepared.

We claim:

1. A process comprising concentrating a milk product, adding to the product an additive selected from the group consisting of a phosphatide, mono- and diglycerides in which the fatty acid moieties predominantly contain from 12–18 carbon atoms, and mixtures of these additives, and heat sterilizing the resulting product to give a concentrated milk product which is stabilized against coagulation.

2. The process of claim 1 in which the heat sterilizing consists of heating the concentrated milk product at temperatures in the range 280–240° F. for periods of time in the range 0.25–20 minutes.

3. A process as in claim 1 in which in conjunction with concentrating the milk product containing the additive there is included the step of homogenizing the milk product.

4. A process as in claim 2 in which in conjunction with concentrating the milk product containing the additive there is included the step of homogenizing the milk product.

5. A process comprising concentrating a milk product, adding to the product an additive selected from the group consisting of a phosphatide, mono- and diglycerides in which the fatty acid moieties predominantly contain from 12–18 carbon atoms, and mixtures of these additives, deaerating the resulting product, sterilizing the deaerated product, thence packaging the sterile product in an atmosphere containing not more than about 0.1 micromole oxygen per milliliter of milk to give a concentrated milk product which is stabilized against coagulation and flavor deterioration.

6. The process of claim 5 in which the heat sterilizing consists of heating the concentrated milk product at temperatures in the range 280–240° F. for periods of time in the range 0.25–20 minutes.

7. A process as in claim 5 in which in conjunction with concentrating the milk product containing the additive there is included the step of homogenizing the milk product.

8. A process as in claim 6 in which in conjunction with concentrating the milk product containing the additive there is included the step of homogenizing the milk product.

9. A process for stabilizing a concentrated, high-temperature-short-time sterilized milk product against gelation which comprises incorporating into a concentrated milk product about from 0.2 to 0.6% by weight of an additive from the group consisting of a phosphatide, mono- and diglycerides in which the fatty acid moieties predominantly contain from 12–18 carbon atoms, and mixtures thereof and subjecting the product to high-temperature-short-time sterilization.

10. A concentrated, high-temperature-short-time sterilized milk product containing, as a gelation inhibitor, a member of the group consisting of a phosphatide, mono- and diglycerides in which the fatty acid moieties predominantly contain from 12–18 carbon atoms, and mixtures thereof.

11. A concentrated, high-temperature-short-time sterilized milk product containing, as a gelation inhibitor, about from 0.2 to 0.6% by weight of a member of the group consisting of a phosphatide, mono- and diglycerides in which the fatty acid moieties predominantly contain from 12–18 carbon atoms, and mixtures thereof.

12. A concentrated, high-temperature-short-time sterilized milk product containing about from 19.6 to 27% milk solids and a gelation inhibitor from the group consisting of a phosphatide, mono- and diglycerides in which the fatty acid moieties predominantly contain from 12–18 carbon atoms, and mixtures thereof.

13. A concentrated, high-temperature-short-time sterilized milk product containing about from 19.6 to 27% milk solids and about from 0.2 to 0.6% by weight of a gelation inhibitor from the group consisting of a phosphatide, mono- and diglycerides in which the fatty acid moieties predominantly contain from 12–18 carbon atoms, and mixtures thereof.

References Cited in the file of this patent
UNITED STATES PATENTS

| | | |
|---|---|---|
| 2,604,403 | Wiechers | July 22, 1952 |
| 2,845,350 | Wilcox | July 29, 1958 |

OTHER REFERENCES

Wittcoff: "The Phosphatides," 1951, pub. by Reinhold Pub. Corp., N.Y., p. 8.